United States Patent Office 3,103,446
Patented Sept. 10, 1963

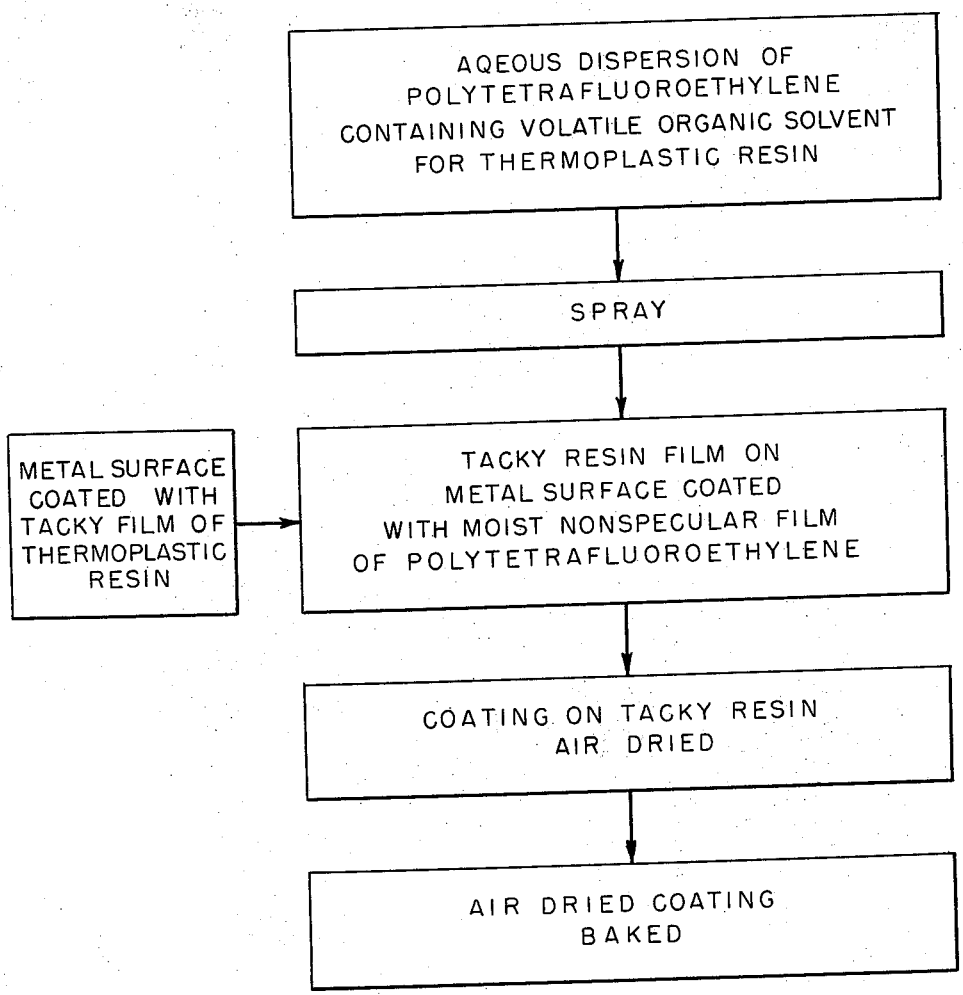

3,103,446
METHOD OF ADHERING THIN FILMS OF POLY-TETRAFLUOROETHYLENE TO METALS
Vincent G. FitzSimmons, McLean, Va., assignor to the United States of America as represented by the Secretary of the Navy
Filed July 31, 1961, Ser. No. 128,266
3 Claims. (Cl. 117—75)
(Granted under Title 35, U.S. Code (1952), sec. 266)

The invention described herein may be manufactured and used by or for the Government of the United States of America for governmental purposes without the payment of any royalties thereon or therefor.

This invention relates to a method for adhering thin films of polytetrafluoroethylene to metal surfaces.

Polytetrafluoroethylene is a chemically resistant material having a low coefficient of friction and is useful as a solid lubricant on metals. Application of the polymer to the metal surface is usually accomplished by spraying the metal with an aqueous dispersion of the polymer and sintering of the polymer film to firmly bond the polymer to the metal surface. Due to porosity in the sintered film, complete protection against rust and corrosion is not afforded to the metal surfaces.

It has been recently proposed to adhere thin films of polytetrafluoroethylene to metal surfaces and to provide at the same time an improved protection to the metal against rust and corrosion by a method in which surface of the metal is sprayed with an aqueous dispersion of polytetrafluoroethylene containing a heat-reactive phenolic resin, which may be in solution or suspension, and the resulting film subjected to baking to cure the resin and bond the polymer film to the resin. This method depends for success on the aqueous dispersion breaking as the spray hits the metal surface to give a sequential coating in which the resin is deposited on the metal surface and the polymer on the formed resin film. Premature or delayed breaking of the aqueous dispersion will result in failure to obtain the required sequential coating. The aqueous dispersions have a very limited storage life and will frequently break before or during spraying. Over stabilizing of the dispersions has also been found to give negative results. Present practice is to conduct the method with the use of aqueous dispersions which have been freshly prepared at the time of spraying.

The present invention has as its principal object the provision of a new and improved method for obtaining adhesion of thin films of polytetrafluoroethylene to metal surfaces and providing more complete protection thereto against rust and corrosion.

The above and other objects can be accomplished by the practice of the method of my invention which comprises coating the metal surface with a thin film of a tacky thermosetting phenolic resin, spray-coating the surface of the tacky resin film with a small amount of toluene or xylene which is sufficient to dissolve the surface of the tacky resin and with a water-moist, non-specular thin film of polytetrafluoroethylene by means of a single spray containing both the solvent and an aqueous dispersion of polytetrafluoroethylene, subjecting the resulting films on the metal surface to air-drying for time sufficient to evaporate a substantial proportion of the water and solvent therefrom, and then subjecting the films on the metal surface to baking for a time sufficient to cure the resin film.

The method of my invention is illustrated by the flow-sheet of the single FIGURE of the accompanying drawing.

The method of my invention is effective to firmly adhere thin films of polytetrafluoroethylene to metal surfaces through the action of the small amount of water-immiscible volatile organic solvent, toluene or xylene, which, along with the water suspension of polytetrafluoroethylene particles, is deposited on the surface of the tacky resin film from the spray. The solvent dissolves the surface of the tacky resin film by solvent action and sets-up an emulsion of the solvent, resin, water and particles of polytetrafluoroethylene in the interface between the resin film and the polytetrafluoroethylene film. On air-drying and baking of the films on the metal surface, this emulsion is broken and a solid intermediate layer containing interspersed resin and polytetrafluoroethylene particles is formed integrally with the resin and polytetrafluoroethylene films and bonds these two films together. The curing step serves to bond the resin film to the metal surface.

The thermosetting phenolic resin may be applied to the metal surface by spraying with a solution of the resin in a suitable volatile organic solvent. The surface of the metal should be clean and preferably is lightly sandblasted. The thickness of the tacky resin film applied to the metal surface may be of the order of from 0.1 to 0.2 mil. Any thermosetting phenolic resin may be employed for forming the tacky resin film on the metal surface in the method of the invention, for example, the known heat-reactive phenolic resins made by condensing formaldehyde with phenol, mixed cresols or other substituted phenols to the resole resin stage, and heat-reactive phenolformaldehyde resins which are blended with minor amounts of epoxy resins or of polymers such as polyvinylbutyral to improve flexibility in the resin in the cured condition. A number of heat-reactive phenolic resins are available commercially either as solutions in a volatile organic solvent or as a solid and sold under various trade names such as Amberlite, Bakelite, and Durez.

Sprayable aqueous dispersions of polytetrafluoroethylene containing emulsified toluene or xylene to be used in the method of my invention can be prepared as described in U.S. Patent 2,613,193 to Osdal. The solvent is gradually added to the aqueous polymer dispersion and gently stirred to avoid violent movement of the dispersion which tends to cause coagulation. Such aqueous dispersions are used in the method as contain from about 35 to 60%, preferably about 50%, by weight of polytetrafluoroethylene. They may be pigmented or not. The amount of the solvent incorporated into the aqueous polymer dispersion may range from about 5 to 20% by volume on the aqueous dispersion. Where the polymer dispersions are not pigmented, smaller amounts are added, about 5% by volume thereon, to avoid coagulation of the dispersion.

The aqueous dispersion of polytetrafluoroethylene containing the emulsion of toluene or xylene may be sprayed to the tacky resin surface by known paint-spraying technique using a conventional spray gun of the suction type. The spray cap of the gun is held at a distance from the tacky resin surface such that the deposited polymer film is non-specular, although water moist. A practical spray distance is from about 18 to 24 inches. The thickness of the non-specular syrayed film of the polymer on the tacky resin surface may be of the order of from 0.2 to 0.3 mil. The term non-specular is used herein in the sense that it is employed in the art of paint spraying to describe a flat or matte type finish to the coating, i.e., the coating is free from liquid on the surface which would cause it to glisten. A wet, flowable condition of the deposited polymer film is to be avoided since it will give rise to a channeled condition in the film after the baking.

Air-drying of the resin and polymer films on the metal surface prior to baking may be carried out at room or at moderately elevated temperatures up to about 130° F. and is conducted for a time sufficient to evaporate a substantial amount of water and solvent therefrom. This measure protects against blistering of the films in the baking step by erupting vapors.

The method of the invention is illustrated by the following specific examples of its application.

*Example 1*

A steel panel, 2" x 2" x 1/16", was washed with Varsol (petroleum hydrocarbon solvent) to remove any oil or grease, lightly sand-blasted with #80 silica, again washed with Varsol, and dried in air at room temperature. A volatile organic solvent solution of a phenolformaldehyde resin was thinned to 19% by weight solids concentration by the addition of toluene thereto and sprayed to a surface of the prepared steel panel to form a tacky resin film thereon of approximately 0.1–0.15 mil thickness. To an aqeuous dispersion of polytetrafluoroethylene (Teflon Green Primer 850–204 of the Du Pont Company) was added 10% by volume thereon of toluene, the addition being made gradually and with gentle stirring. This modified dispersion was sprayed to the tacky resin film on the metal in the form of a fine spray from a DeVilbiss Aspirating Spray Gun, Type IGA, at a spray distance to give a non-specular (dull), water-moist top film of the polymer of approximately 0.2–0.3 mil thickness. At the same time, a small amount of toluene was deposited on the tacky resin from the spray. The resin and polymer films on the steel panel were air-dried at room temperature for about 4 hours, with removal of a substantial proportion of the water and toluene therefrom, and then baked in an air-circulating oven for 1 hour at 350° F. to cure the resin. The specimen was allowed to cool to room temperature. The polymer film was smooth, unbroken and strongly bonded to the steel through the cured resin film.

*Example 2*

A steel panel, 2" x 2" x 1/16", was prepared as in Example 1. A volatile solvent solution of an epoxy-phenol-formaldehyde resin sold under the trade name "Clear Gold Varnish 79270" by the Enterprise Paint Mfg. Co., Chicago, Illinois, was thinned to a spraying viscosity of 17.5% solids concentration by the addition of toluene and sprayed to a surface of the prepared steel panel to form a thick tacky film of the resin thereon of approximately 0.1–0.15 mil thickness. The tacky resin film was then sprayed in the manner and with the aqueous dispersion of polytetrafluoroethylene containing emulsified toluene as described in Example 1 to form a non-specular (flat finish) water-moist thin film of the polymer thereon of approximately 0.2–0.3 mil thickness and deposit a small amount of toluene on the surface of the tacky resin. The resin and polymer films on the steel surface were air-dried as in Example 1 and then heated in an air-circulating oven for one hour at 300° F. to cure the resin. The resin film may be cured, if desired, by conducting the baking at 400° F. for 15 minutes. The specimen was allowed to cool to room temperature. The polymer film was smooth and continuous, without break, and firmly adhered to the steel surface through the cured resin bonding film. The cured resin film in this instance had greater flexibility due to the epoxy resin content.

In the manner of the preceding examples, smooth, continuous thin films of polytetrafluoroethylene may be strongly adhered to other ferrous metal surfaces, e.g. of iron and iron alloys, and to surfaces of various non-ferrous metals, for example, of aluminum, copper, nickel, brass, etc., without the necessity of fusing or sintering the polytetrafluoroethylene film thereon.

While the invention has been described herein with reference to certain specific embodiments, it obviously may be otherwise practiced without departing from the spirit or scope thereof and, accordingly, it is intended that such embodiments shall be taken by way of illustration and not in limitation except as may be defined in the appended claims.

What I claim is:

1. A method of adhering a thin film of polytetrafluoroethylene to a metal surface which comprises coating the metal surface with a thin film of a tacky thermosetting phenolic resin, spray-coating the surface of the tacky resin film with a small amount of a water-immiscible volatile organic solvent of the group consisting of toluene and xylene which is sufficient to dissolve the surface of the tacky resin film and with a water-moist, non-specular, thin film of polytetrafluoroethylene by spraying to said surface an aqueous dispersion of polytetrafluoroethylene containing the organic solvent of the aforesaid group emulsified therewith, air-drying the films on the metal surface for a time sufficient to evaporate a substantial proportion of the water and solvent therefrom, and then baking the films on the metal surface at a temperature below that at which polytetrafluoroethylene is fused and for a time sufficient to cure the thermosetting resin film.

2. A method as defined in claim 1, wherein the metal surface is a ferrous metal surface.

3. A method as defined in claim 1, wherein the metal surface is a steel surface.

References Cited in the file of this patent

UNITED STATES PATENTS

| | | |
|---|---|---|
| 2,613,193 | Osdal | Oct. 17, 1952 |
| 2,844,557 | Welch | July 22, 1958 |
| 2,961,345 | Petriello | Nov. 22, 1960 |

FOREIGN PATENTS

| | | |
|---|---|---|
| 569,012 | Canada | Jan. 13, 1959 |